US008470424B2

(12) United States Patent
Bentley

(10) Patent No.: US 8,470,424 B2
(45) Date of Patent: Jun. 25, 2013

(54) BEVERAGE PACKAGING LABELS MADE OF RESIN BLENDS THAT PROVIDE ENHANCED GAS BARRIER PROPERTIES AND RELATED METHODS

(75) Inventor: Darrell Bentley, Murphy, TX (US)

(73) Assignee: Dr Pepper/Seven Up, Inc., Plano, TX (US)

( * ) Notice: Subject to any disclaimer, the term of this patent is extended or adjusted under 35 U.S.C. 154(b) by 407 days.

(21) Appl. No.: 12/823,069

(22) Filed: Jun. 24, 2010

(65) Prior Publication Data

US 2011/0315267 A1 Dec. 29, 2011

(51) Int. Cl.
*B29D 22/00* (2006.01)
*B29D 23/00* (2006.01)
*B32B 1/08* (2006.01)

(52) U.S. Cl.
USPC ..... 428/36.91; 428/35.7; 428/36.9; 428/36.6; 428/36.7; 428/480

(58) Field of Classification Search
USPC .................. 428/35.7, 36.9, 36.91, 36.6, 36.7, 428/480
See application file for complete search history.

(56) References Cited

U.S. PATENT DOCUMENTS 3,864,151 A 2/1975 Shonebarger et al.
5,232,754 A * 8/1993 Waugh ......................... 428/36.7
5,507,525 A 4/1996 Leuenberger
6,749,785 B2 6/2004 Subramanian et al.
6,827,972 B2 12/2004 Darras et al.
7,581,942 B2 9/2009 Richards et al.
2010/0040904 A1 2/2010 Cloutier et al.

OTHER PUBLICATIONS

Alexander et al. "Plasma Polymer Chemical Gradients for Evaluation of Surface Reactivity: Epoxide Reactions with Carboxylic Acid Surface Groups", Journal of Materials Chemistry, 2004, 14, pp. 408-412 (5 pages).

Ming-Ye et al. "Polymer Blends of PET-PS Compatibilized by SMA Epoxy Dual Compatiblizers", 1999, 73, pp. 2029-2040 (12 pages).

* cited by examiner

*Primary Examiner* — Michael C Miggins
(74) *Attorney, Agent, or Firm* — Cox Smith Matthews Incorporated

(57) ABSTRACT

A method of improving the shelf life of a beverage may involve selecting a container for containing a beverage, the container having a first gas barrier property; selecting a blended label having a second gas barrier property; applying the blended label to the container such that the container has a resultant gas barrier property that is greater than the first gas barrier property; and placing the beverage in the container. A beverage container may have a PET wall having a first gas barrier property and a blended label adjacent the PET wall, the blended label having a second gas barrier property, wherein the container has a resultant gas barrier property that is greater than the first gas barrier property. Two different beverage products may be bottled in the same type of container using blended labels that have different gas barrier properties tailored for each beverage product.

5 Claims, 2 Drawing Sheets

BEVERAGE PACKAGING LABELS MADE OF RESIN BLENDS THAT PROVIDE ENHANCED GAS BARRIER PROPERTIES AND RELATED METHODS

FIELD

This disclosure relates generally to beverage packaging labels made of resin blends that provide enhanced gas barrier properties and thereby increase the shelf life of beverages and related methods.

BACKGROUND

Containers commonly used to package beverages include, for example, polyethylene terephthalate (PET) containers. Those containers, of which PET is one example, may have a number of desirable characteristics, including excellent durability, natural clarity, and low cost. Among drawbacks of some of those containers are that they may not be completely impermeable to some gases including, for example, oxygen and carbon dioxide. For carbonated beverages, this can be particularly problematic, and the shelf life of those beverages may be limited when those beverages are packaged in such containers. After some period, carbonated beverages may develop a taste that lacks their characteristic fizz, and they may be considered flat by consumers. The shelf life of beverages may also be dependent upon other gases, and may, for example, be related to the ingress of oxygen. Oxidation of materials is important to control in a number of beverages including, among others, juice and beer. In part for those reasons, more expensive containers such as glass or specialty copolymers may be used in containers for some beverages.

In view of those difficulties, a number of strategies have been developed to try to increase the gas barrier properties of containers such as PET containers. Strategies have been developed that modify the polymers of containers, and a number of co-polymers have been developed that have improved gas barrier properties. Unfortunately, such strategies may be expensive, may adversely modify other positive attributes of PET containers, and may complicate the organization of beverage production lines. There is, therefore, a need for strategies to improve the barrier properties of PET containers, to achieve that improvement in a cost effective manner, and to implement methods that may be readily adopted in a beverage bottling facility.

SUMMARY

Methods of improving the shelf life of a beverage may involve the use of packaging material that comprises labels made of materials that have improved gas barrier properties. Such labels may be produced from resin blends that may include, for example and without limitation, poly (ethylene napthalate) (PEN), liquid crystalline polymers (LCP), poly vinyl alcohol, polyamide materials such as nylon, clay, nanocomposite materials, PET, or combinations thereof. Such resin blends may include materials that may be used to form polymers and may, in some embodiments, include other materials. In some embodiments, those materials may be combined with a polymer and may exist in a crystalline state, an amorphous state, or a polycrystalline state. Such labels may be designed to control the gas barrier properties of beverage packaging material. In some embodiments, such labels may be made of a co-polymer comprised from PET and one or more materials that are capable of forming a polymer blend with PET. Related packaging strategies may, in some embodiments, involve use of the same type of container, or containers made with a similar material or similar structural properties, for two or more different beverage products, and the gas barrier properties of the packaging may be tailored for those particular beverage products using labels designed for those products.

DETAILED DESCRIPTION

Figure 1:
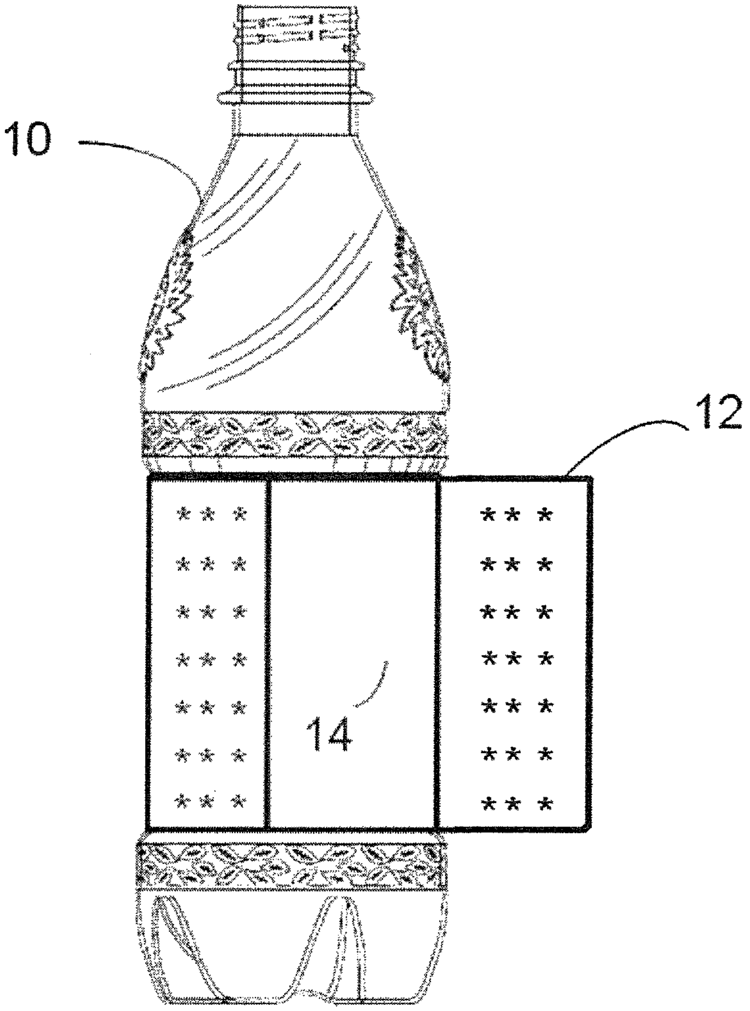
FIG. 1 is a side view of a bottle with a label attached and slightly peeled away from a central portion of that bottle.

The following terms as used herein should be understood to have the indicated meanings.

When an item is introduced by "a" or "an," it should be understood to mean one or more of that item.

The term "beverage" means any drinkable liquid or semi-liquid, including for example flavored water, soft drinks, fruit drinks, coffee-based drinks, tea-based drinks, juice-based drinks, milk-based drinks, gel drinks, carbonated or non-carbonated drinks, alcoholic or non-alcoholic drinks.

The term "blended label" means a label produced from a resin blend.

The term "clay" as used herein means any of various naturally occurring materials comprised of hydrous aluminium phyllosillicates.

The term "co-polymer" means a combination of two or more materials that may be polymerized and that may be blended together.

The term "comprises" means includes but is not limited to.

The term "comprising" means including but not limited to.

The term "container" means any receptacle that may used to hold or carry something including for example bottles, jars, cans, or cartons.

The term "having" means including but not limited to.

The term "immiscible polymer blend" means a combination of two or more materials that may be polymerized and that are combined under conditions wherein the two or more materials maintain distinct domains.

The term "including" means including but not limited to.

The term "liquid crystalline polymer" means a polymer that maintains at least some long range orientational structure but has little or no positional order.

The term "resin" means any material that may exist in a fluid state including a fluid state that may or may not be highly viscous and that may harden following some treatment.

This disclosure relates generally to beverage packaging labels made of resin blends that provide enhanced gas barrier properties and thereby increase the shelf life of beverages and related methods. The shelf life of a beverage may be affected by various factors including, for example, the transport of gaseous species though walls of a beverage container. Gases that may affect the shelf life of a beverage include, by way of nonlimiting example, carbon dioxide, oxygen, and water vapor. Beverage containers may be modified using various strategies to control the transport of gases. Resin blends may, for example, be used to create co-polymers that may be used to manufacture the walls of a bottle with improved gas barrier properties.

Bottles manufactured with different wall materials may have improved gas barrier properties. However, the use of those different bottles may complicate a bottling production line. If manufacture of bottles and filling of those bottles are organized together in a production line, the throughput of those processes should be correlated. Logistical problems with correlation of those processes together on the same bottling line may be particularly severe when specialty resin blends are used for container walls, and such difficulties may prohibit the use of those strategies. Problems that may occur in production of bottles from those resin blends may impact the entire bottling production line, which is a potentially severe problem. Alternatively, bottles with different wall materials may be purchased and stored for use on a bottling line. However, the use of multiple different bottles on a production line may not be ideal, may complicate storage and distribution chains, and may also create other problems. Storage space is an important concern for any bottling production line, and keeping multiple different varieties of pre-manufactured bottles on site on or near a bottling production line may be inefficient and costly.

The cost of storage of pre-manufactured bottles is not the only issue associated with strategies for controlling gas transport using containers whose walls are manufactured from specialty resin blends. For example, the walls of those containers will generally have different physical properties, and may be handled differently by automated machinery in a bottling production line. This may be a significant concern for bottling facilities, including but not limited to those facilities where a range of different products may be run through the same or at least some common handling operations. For those filling lines, modification or adjustment of the handling system such as to optimize those lines for different bottles may be time consuming and costly. Use of the same type of bottle for different products may minimize some of the aforementioned concerns; however, those products may have different gas barrier constraints, and such a solution may be less than ideal.

An improved method of controlling the gas barrier properties of a container may involve the use of one or more blended labels that may be co-polymers made from a resin blend. Resin blends may include, for example and without limitation, poly (ethylene napthalate) (PEN), liquid crystalline polymers (LCP), poly vinyl alcohol, polyamide materials such as nylon, clay, nanocomposite materials, PET, or combinations thereof. Resin blends may include materials that may be used to form polymers and may, in some embodiments, include other materials. In some embodiments, those materials may be combined with a polymer and may exist in blended labels in a crystalline state, an amorphous state, or a polycrystalline state. Blended labels may be designed to control the gas barrier properties of packaging material. In some embodiments, blended labels may be a co-polymer comprised from PET and one or more materials that are capable of forming a polymer blend with PET.

Application of a blended label to a container may improve the gas barrier properties of that container. The use of blended labels may greatly simplify strategies for optimization of gas permeation. By way of nonlimiting example, operations associated with manufacture of bottles and the timing constraints associated with those operations, previously described above, may be impacted to the extent those operations and associated machinery involve application of labels. Of course, there is a significant difference in cost between bottling machinery and labeling machinery, and labeling machinery may be easier to modify. In addition, and in some non-limiting embodiments, a blended label may be made well before its application to a container on a high-speed beverage production line. Labels are substantially two-dimensional objects, and the space requirements and storage costs of such objects are much less than that of bottles. Storage of labels may, for example, be accomplished by winding blended labels on a spool or other device, storing them as sheets, or in some other manner.

In some embodiments, a beverage may be packaged on a bottling production line using, for example and without limitation, relatively inexpensive, mechanically strong, dent-resistant or fracture-resistant containers, such as PET containers, or some other desirable containers. Desirable containers may have certain beneficial handling properties, and a bottling line may be optimized for handling those or similar containers. At some stage in the process, a blended label may be made, and that blended label may be attached to a container at some stage in a bottling production line.

The properties of a blended label may be optimized independently of the properties of the walls of a container. This is in contrast to at least some bottles that are formed from resin blends. Those resin blends may under some conditions be immiscible polymer blends, and may for example be fashioned into container walls that are co-polymers with a substantially lamellar structure. A substantially lamellar structure may improve the gas barrier properties of container walls because, for example, a gas may have to pass through distinct polymer domains in passing across the container walls. However, such a structure may compromise the physical properties of container walls that may be made from such co-polymers. Therefore, and irrespective of other advantages, packaging a beverage in a bottling production line may be ideally suited to methods described herein including, for example and without limitation, embodiments in which a beverage is added to a desirable container, which is selected for reasons including but not limited to its physical properties, and modification of a gas barrier property of that container is achieved through the application of a blended label. By way of nonlimiting example, such an advantage may be achieved using a PET container and a blended label applied to that container. A container having an initial gas barrier property may be selected for a given beverage, and a blended label having a second gas barrier property may be selected and applied to the container such that the container has a resultant gas barrier property that is greater than the initial gas barrier property. The gas barrier property of the blended label may be the same or different from the initial gas barrier property of the container, depending on the magnitude of change in gas barrier property that is desired for the container in view of the particular gas that is to be regulated with respect to the container and the characteristics of the particular beverage.

There may also be certain advantages for using blended labels in the bottling of more than one beverage in a single production line. For example and without limitation, two or more beverage products may be packaged on one bottling line, and those beverages may have different tolerances for gas permeation. One beverage may, for example, be a carbonated beverage and may be highly susceptible to taste degradation upon carbon dioxide egress. Another beverage may, for example, be a fruit juice and may be less susceptible to carbon dioxide transport but highly susceptible to the flow of oxygen. Those beverages may be packaged on the same line, or on a line that shares some common machinery with another line. The optimization of gas barrier properties for those beverages, with different gas barrier concerns, could be achieved starting with the same or similar bottles and changing a stage that includes application of a blended label. The ability to change the gas permeability properties of more than one product on one production line by changing blended labels may, for example, greatly simplify ordering and procurement operations in a complicated bottling facility. As noted above, it is easier and less expensive to store reserve blended labels, or reagents useful for producing blended labels, at a bottling plant than different variations of bottles.

Referring to FIG. 1 of the drawings, one container 10 of any number of possible containers is shown with a blended label 12 placed on that container 10. For clarity, blended label 12 is shown partially peeled away from a central portion 14 of container 10. A central portion 14, or any other portion of container 10, or the complete outside of container 10, may be covered partially or completely by one or more blended labels 12.

Figure 2:
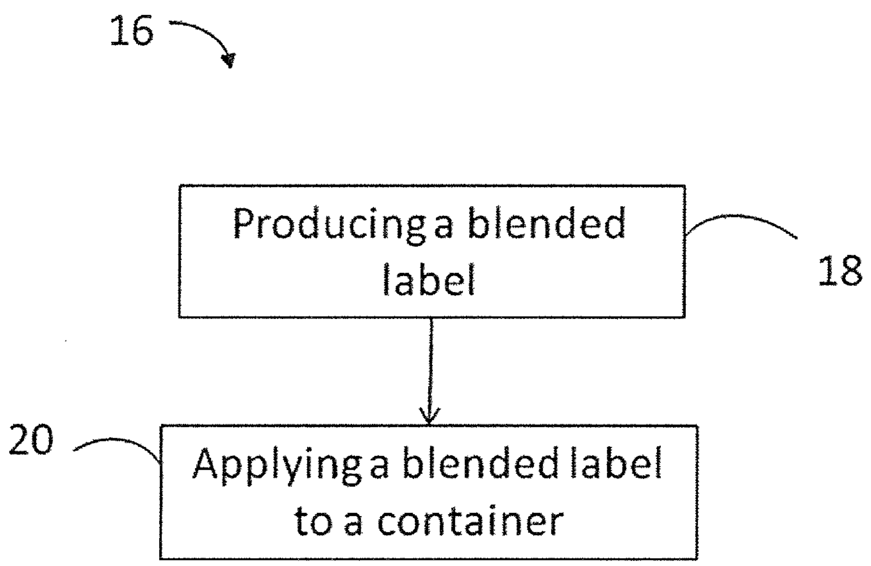
FIG. 2 is a flowchart of a method of producing labels and applying labels to beverage containers.

Referring to FIG. 2 of the drawings, a method 16 of producing blended labels and applying blended labels to a container is shown. Method 16 may include producing a blended label from a blended resin at step 18 and applying a blended label to a container at step 20.

Any of various resin blends may be used in a step 18 of producing a blended label. In some embodiments, resin blends may include, for example and without limitation, PET as a first component and one or more other materials, including poly(ethylene napthalate) (PEN), liquid crystalline polymers (LCP), poly vinyl alcohol, polyamide materials such as nylon, clay, nanocomposite materials, or any combination thereof. Resin blends that are miscible or immiscible may be used, and in some embodiments two or more materials may be processed in ways to encourage the formation of two or more phases in a substantially lamellar geometry. Resin blends may be poured, fashioned, or molded in various ways into substantially two-dimensional objects such as sheets or some other desired geometry. Materials may be cut or fashioned into the final shape of a label intended for application to a container at any time, including before or after curing. The formation of a blended label may involve one or more curing stages, and during those curing stages a constant temperature or a variable temperature profile may be used. A temperature profile may be selected based on the particular reagents in the blend and may, in some embodiments, be selected to minimize thermal stress that may be induced during curing. In some embodiments, the rate of curing may be controlled by the controlled application of energy from a source such as heat or light. A blended label may be produced from a resin blend by pouring or curing a single layer of material or may be produced in a series of layers to form a multi-layer structure. In some embodiments, the thickness of a co-polymer layer in a multi-layered structure may be selected because that thickness may minimize thermal stress or the formation of pinholes or material defects. In some embodiments, the thickness of an individual layer of a blended label in a multi-layer structure may be within a thickness regime such that the gas barrier properties of that layer increase as such individual layer's thickness increases. An adjacent layer in a multi-layer structure may be substantially the same as an underlying layer or, in some embodiments, may be an intermediate film that may function to relieve stress in a multi-layered co-polymer system. The total thickness of a blended label may, in some embodiments, be selected such that the label may be thin enough to be flexible but thick enough to provide an effective gas barrier. In some embodiments, the thickness of a blended label may be between about 15 micrometers and about 80 micrometers.

In some embodiments a blended label may be applied to a PET container in a shrink wrap process. For some carbonated beverages, significant taste degradation, may occur if the loss of carbonation is between about 15% and about 20%, and without other containment strategies the shelf life of such beverages in some PET containers may be less than about 10 weeks. Use of a blended label applied as a shrink wrap to a PET container may be expected in some embodiments to improve the barrier properties of beverage packaging by an amount from about 10% to about 400%. Those improvements may, in some embodiments, improve the shelf life of a carbonated beverage to a period from about 11 weeks to about 50 weeks.

Expectations in shelf life improvement may, for example and without limitation, be based on the barrier properties of a material that may be used as a label, the thickness of the label applied, and the fraction of a container that is covered by a blended label. Use of thicker blended labels may improve the barrier properties of beverage packaging material; however, such may also increase the cost of packaging material. The barrier properties of a number of materials are known, including, for example, because those materials have been used for container walls. The use of some materials that have been used on container walls may be used for blended labels. The barrier properties of a surface, film, or bottle may be measured in various ways using standard testing procedures. Permeation rates may, for example, be measured by placing a bottle into a sealed chamber and measuring the amount of a gas that enters that chamber as a function of time. Such measurements may, for example, be taken using a MOCON Permatran-C Model 10 testing system, which is a trademark of Modern Controls Inc. Near room temperature, the permeation rate of carbon dioxide from various containers may range from between about 2 cc/day to about 15 cc/day. Carbonated beverages in different containers may have different volumes, different surface areas, or both, and may lose more or less carbon dioxide, depending, for example, on those or other factors. Application of different blended labels may improve the permeation rate of containers, and for some containers with some blended labels a carbon dioxide loss of less than 1 cc/day may be expected.

A blended label 12 may be applied to a container in a step 20 as shown in FIG. 2. Blended labels may be applied to containers of various shapes, sizes, and types, including beverage bottles, for example. Any of various types of blended labels may be made, including by way of nonlimiting example shrink-sleeve labels, pressure sensitive labels, adhesive labels or other varieties of labels. In some embodiments, a blended label may be made from material that is designed to change shape upon the application of heat and may for example be a shrink-wrap label. A shrink-wrap label may be applied to a container in a manner that is loose. Upon application of heat, the shrink-wrap material may change shape and may more tightly fit around that container. Blended labels may be dispensed from various labeling machines, and those machines may use blended labels that may or may not have been precut. Labeling machines may hold a label in a spool, reel, sheet dispenser, or other device before application to a container. In some embodiments, blended labels may be made before they are loaded on a machine on a bottling production line.

A blended label may be applied to various containers including bottles that may be filled or are intended to be filled with a beverage. Those containers may be PET bottles or may be composed of other materials. In some embodiments, those bottles may be comprised of co-polymer walls produced from a co-polymer resin, or those bottles may be coated. In that regard, the use of blended labels does not preclude the use of other strategies that improve gas barrier properties, and some embodiments described herein may involve the use of blended labels with other strategies for gas containment, including for example, the use of coated labels. The use of coated labels is described in more detail in U.S. patent application Ser. No. 12/822,959 entitled "Beverage Containers Having Coated Labels with Modified Gas Barrier Properties and Related Methods," which is owned by the assignee of this application, has the same filing date as this application, and is incorporated herein by reference.

While many examples in this document refer to methods of producing blended labels with improved gas barrier properties and to blended labels produced using those methods, it is understood that those methods of producing blended labels with improved gas barrier properties and to blended labels produced using those methods are described in an exemplary manner only and that other methods may be used. Additionally, other reagents may be used, depending on the particular needs. Any of the features described herein may be used in any desired combination. Although the foregoing specific details describe certain embodiments, persons of ordinary skill in the art will recognize that various changes may be made in the details of these embodiments without departing from the spirit and scope of this invention as defined in the appended claims and considering the doctrine of equivalents. Therefore, it should be understood that this invention is not limited to the specific details shown and described herein.

What is claimed is:

1. A beverage container comprising:

a container comprising a PET wall having a first gas barrier property; and a blended label adjacent said PET wall, said blended label having a second gas barrier property;

wherein said blended label comprises a combination of PET and another material selected from liquid crystalline polymers (LCP), clay, and nanocomposite materials;

wherein said container has a resultant gas barrier property that is greater than said first gas barrier property.

2. The beverage container of claim 1 wherein said second gas barrier property improves the barrier properties of said beverage container with respect to oxygen.

3. The beverage container of claim 1 wherein said blended label comprises:

a first polymeric material comprising PET; and a second material selected from liquid crystalline polymers (LCP), and clay.

4. The beverage container of claim 1 wherein said resultant gas barrier property yields a permeation rate for carbon dioxide of less than about 1 cc/day, and wherein said blended label comprises:

a first polymeric material comprising PET; and a second material comprising a nanocomposite material.

5. The beverage container of claim 1 further comprising a beverage in said container, wherein said beverage comprises a carbonated soda and said blended label extends the shelf life of said carbonated soda by about 10% to about 400% as compared to the shelf life of said carbonated soda in said container without said blended label; and wherein a thickness of said blended label is between about 15 micrometers and about 80 micrometers.

* * * * *